US006941460B2

(12) United States Patent
Carro et al.

(10) Patent No.: US 6,941,460 B2
(45) Date of Patent: Sep. 6, 2005

(54) METHOD AND SYSTEM OF MARKING A TEXT DOCUMENT WITH A PATTERN OF EXTRA BLANKS FOR AUTHENTICATION

(75) Inventors: Fernando Incertis Carro, Valencia (ES); Stephen M. Matyas, Manassas, VA (US)

(73) Assignee: International Business Machines Corporation, Armonk, NY (US)

(*) Notice: Subject to any disclaimer, the term of this patent is extended or adjusted under 35 U.S.C. 154(b) by 947 days.

(21) Appl. No.: 09/754,845

(22) Filed: Jan. 4, 2001

(65) Prior Publication Data

US 2002/0013794 A1 Jan. 31, 2002

(30) Foreign Application Priority Data

Jan. 11, 2000 (EP) .............................. 00480016

(51) Int. Cl.[7] .............................. H04L 9/20; H04L 9/00; G06K 9/00
(52) U.S. Cl. ........................................ 713/170; 382/100
(58) Field of Search ................................. 713/170, 171, 713/200; 380/277, 280; 382/100, 187

(56) References Cited

U.S. PATENT DOCUMENTS 5,313,564 A * 5/1994 Kafri et al. .................. 358/1.1
5,590,258 A * 12/1996 Aoyama ...................... 715/531
5,991,403 A * 11/1999 Aucsmith et al. ........... 380/217

OTHER PUBLICATIONS

Swanson et al; "Multimedia Data–Embedding and Watermark Technologies", Jun. 1998, IEEE, vol. 86, No. 6, pp. 1064–1087.*

* cited by examiner

Primary Examiner—Matthew Smithers
(74) Attorney, Agent, or Firm—Thomas A. Beck; Louis P. Herzberg (57) ABSTRACT

The invention discloses how a text document can be marked through the insertion of inter-word blank characters for the purpose of becoming authenticateable. First, text to be marked is edited so as to obtain a canonical form of it conforming to a model. Then, from this canonical form of the text and a secret-key used as inputs, a unique combination of inter-word blank characters positions is computed in which extra blanks are inserted thus, obtaining a marked text document. Authentication of a received marked text document is performed by a recipient, sharing the secret-key, further comparing the received text document to the marked text document so that if they are matching exactly the received text document is accepted as authentic or rejected as fake if not. The invention allows to merge the information necessary to authenticate a text document into the body of the document itself which works as well on soft-copy and hard-copy text documents.

10 Claims, 5 Drawing Sheets

METHOD AND SYSTEM OF MARKING A TEXT DOCUMENT WITH A PATTERN OF EXTRA BLANKS FOR AUTHENTICATION

FIELD OF THE INVENTION

The present invention relates to the field of document authentication. It is more specifically concerned with the authentication of soft or hard copies of plain text documents.

BACKGROUND OF THE INVENTION

In the current environment of computer networks characterized by an exponential growth in the circulation of soft-copy or electronic text documents such as e-mail over unsecured media e.g., the Internet this, combined with the possibility for any one of easily printing and photocopying a hard-copy of the same text documents, a key issue is authentication. It should be possible for the recipient of a text document, be it an electronic message or a hard copy of it, to make sure of its origin so that no one should be able to masquerade as someone else. Also, it should be possible to verify it has not been modified, accidentally on maliciously, en route. To this end methods have been devised to perform authentication.

The standard solution, which fits well with electronic text documents, consists in adding a MAC or Message Authentication Code to soft-copy text documents. A MAC is a digest computed with a one-way hash function over the text and which is also made dependent on a key e.g., a secret-key known only to the sender and the receiver in order this latter can check first, that what it received has well been originated by whom shares the secret-key with it and second, that the document has not been altered. For example, Secure Hash Algorithm or SHA specified by the National Institute of Standards and Technologies, NIST, FIPS PUB 180-1, "Secure Hash Standard", US Dpt of Commerce, May 93, produces a 160-bit hash. It may be combined with a key e.g., through the use of a mechanism referred to as HMAC or Keyed-Hashing for Message Authentication, subject of the RFC (Request For Comment) of the IETF (Internet Engineering Task Force) under the number 2104. HMAC is devised so that it can be used with any iterative cryptographic hash function thus, including SHA. Therefore, a MAC can be appended to the soft-copy of a text document so as the whole can be checked by the recipient. Obviously, this method does not work on hard-copy text documents since it assumes the addition of checking information to a file. Moreover, this scheme has the inconvenience of indeed separating text and checking information. Thus, this latter can easily be isolated and removed intentionally, in an attempt to cheat, or accidentally just because intermediate pieces of equipment in charge of forwarding the electronic documents are not devised to manipulate this extra piece of information. Then, the checking information should rather be encoded transparently into the body of the text document itself i.e., in a manner that does not affect text readability whatsoever, so that it remains intact across the various manipulations it is exposed to on its way to destination still enabling the end-recipient to authenticate the document.

Another type of approach to authentication which applies mainly to soft-copy images (which thus may also be used on the image of a hard-copy text document still failing to work directly from hard-copy though) consists in hiding data into their digital representation therefore, meeting the above requirement that checking information should better be merged into the document itself. Data hiding has received a considerable attention mainly because of the copyrights attached to digital multimedia materials which can easily be copied and distributed everywhere through the Internet and networks in general. A good review of data hiding techniques is in 'Techniques for data hiding' by W. Bender and al. published in the IBM Systems Journal, Vol. 35, Nos 3&4, 1996. As an illustration to the way data hiding may be carried out the most common form of high bit-rate encoding, reported in here above paper, is the replacement of the least significant luminance bit of image data with the embedded data. This technique which indeed meets the requirement of being imperceivable (the restored image is far to be altered to a point where this would become noticeable) may serve various purposes, similar to authentication including watermarking, aimed at placing an indelible mark on an image or tamper-proofing, to detect image alterations especially, through the embedding of a MAC into the soft-copy image.

However, having to consider a text as an image would be a very costly and inadequate solution in term of storage and bandwidth necessary to transmit it. Although, as stated in here above paper, soft-copy text is in many ways the most difficult place to hide data due to the lack of redundant information in a text file as compared to a picture the manipulation of white spaces i.e., blank characters and more specifically inter-word blank characters purposely inserted by the originator of a text document, in excess of what is necessary to make a text readable, is the most simple way of marking a text that is susceptible to be authenticated without the addition of a separated MAC since the information necessary for the checking is then imbedded, somehow hidden, into the text itself, under the form of blanks, that the casual reader is unlikely to take notice of.

Therefore it is an object of the invention to provide a method to merge the information necessary to authenticate a text document into the body of the document itself.

It is another object of the invention to have this method applicable to both soft-copy and hard-copy text documents.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system of marking a text document through the insertion of inter-word blank characters are disclosed. The method first consists in editing the number of inter-word blank characters of the text document in order to conform to a model so that to obtain a canonical text document. Then, from the canonical text document, to further conform to the model, a subset of positions of the inter-word blank characters is retained in which insertion of blank characters is permitted. After which, using the canonical text document and a secret-key as inputs, a unique combination of positions, among the above subset of positions, is computed. Into each position of the unique combination of positions just computed at least one extra blank character is inserted thus, obtaining a marked text document. The same method also applies to a received marked text document to be authenticated by a recipient sharing the secret-key however, further including a comparison of the received text document to the marked text document so that if they are matching exactly the received text document is accepted as authentic. If not, it is rejected as fake.

Therefore the invention provides a method and a system to merge the information necessary to authenticate a text document into the body of the document itself, through the insertion of extra blanks that the casual reader is unlikely to take notice of, and which works as well on soft-copy and hard-copy text documents.

DETAILED DESCRIPTION OF THE PREFERRED EMBODIMENT

In the following description of figures, at several occasions, a reference is made to 'Applied Cryptography' a book authored by Bruce Schneier and published by John Wiley & Sons, 2nd edition, 1996. References will be abbreviated as [SCH] and may include a particular chapter e.g.: [SCH/Ch.18].

Figure 1:
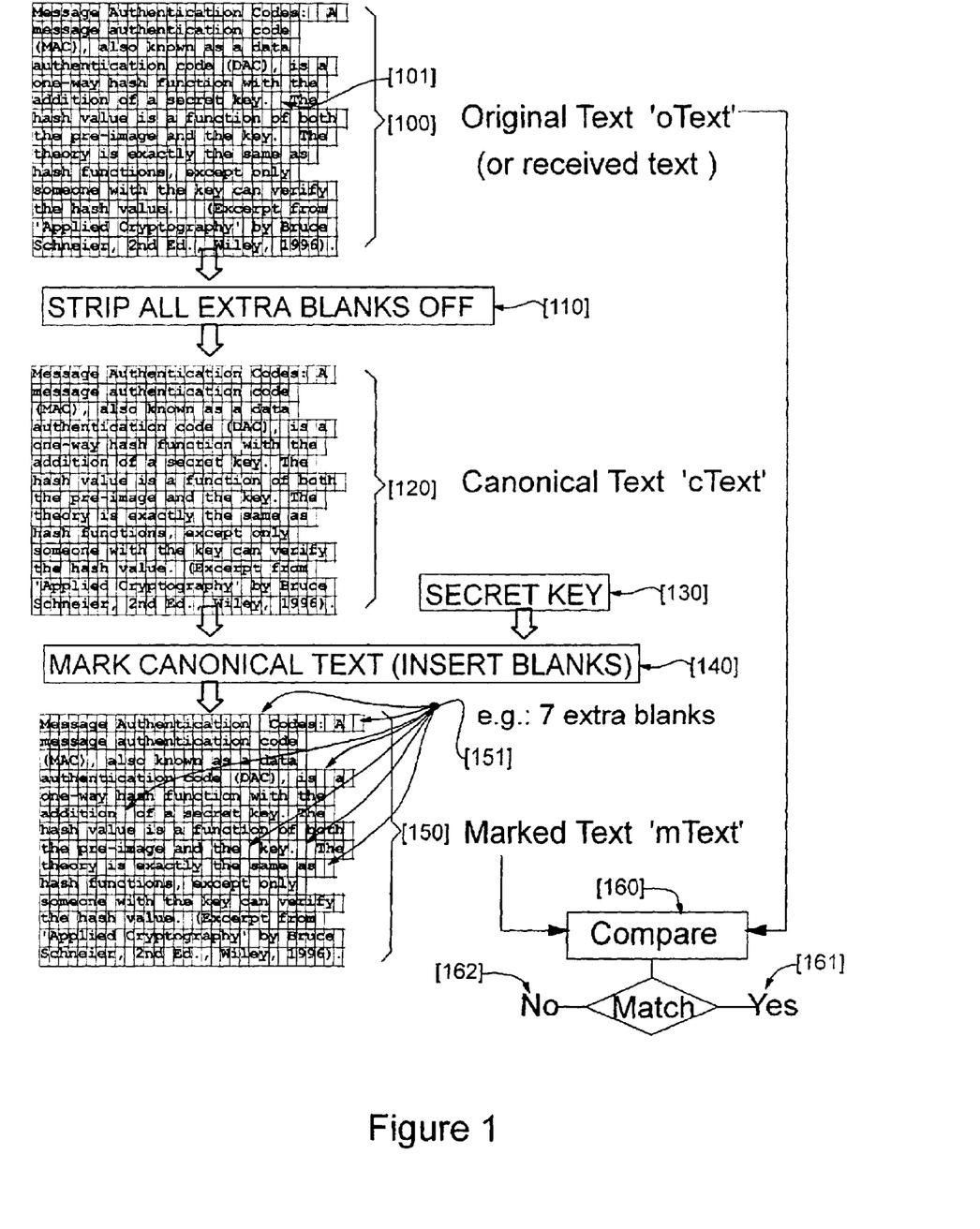
FIG. 1 is an overall description of the invention which allows to authenticate a text through the insertion of extra blanks.
Figure 2:
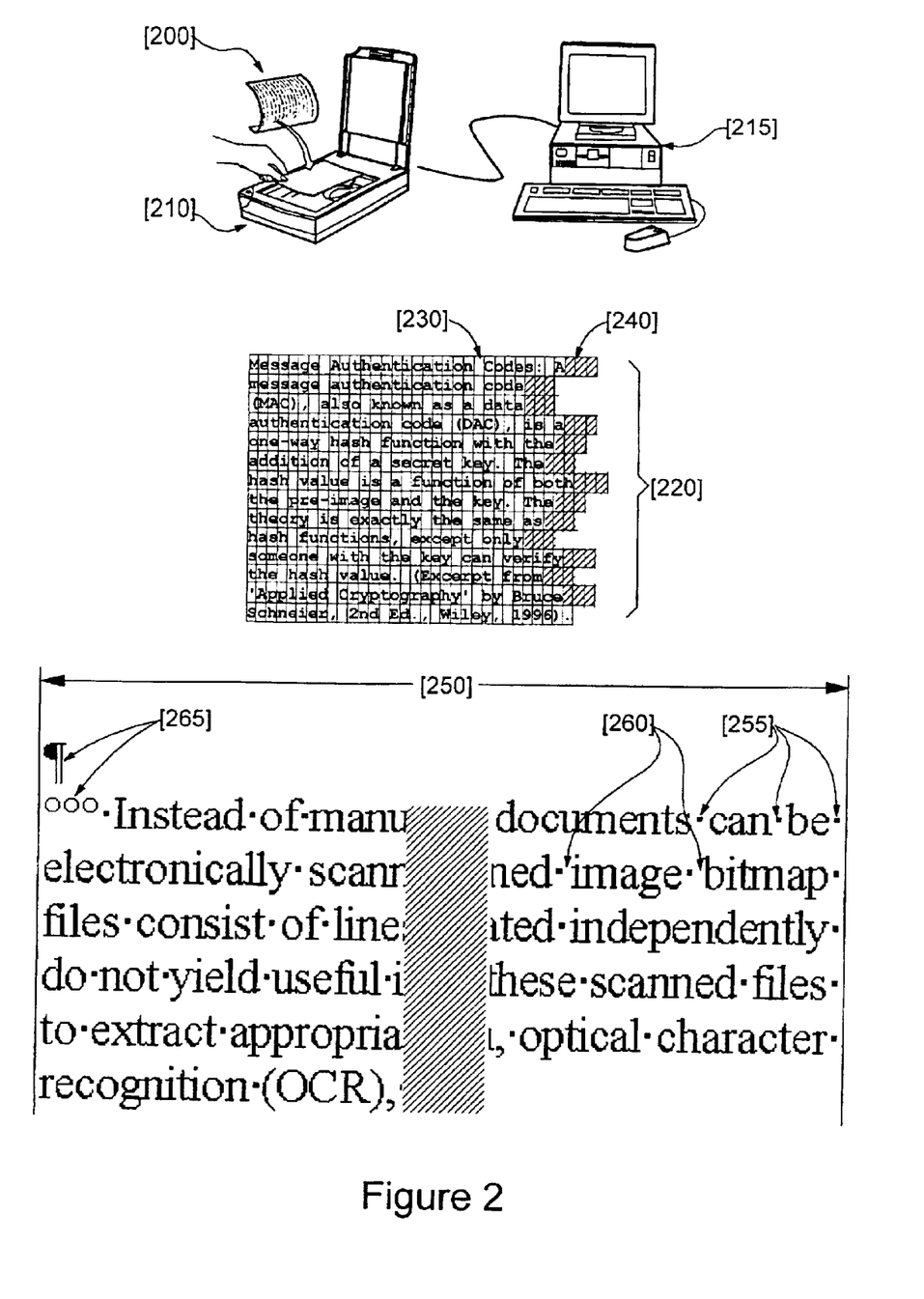
FIG. 2 discusses what is possibly a canonical text and how the invention may also apply to a hard-copy text.

FIG. 1 describes the overall process per the invention in order to obtain a marked text for authentication. Process starts from an original text 'oText' [100] that must be marked so that the recipient of the message can verify it has indeed been marked by whoever shares, with the recipient, a common secret-key [130] while making sure at the same time that the text has not been altered, accidentally or maliciously, on its way. Original text [100] generally contains extra blanks added for typographic reasons. For example, often, two blanks are following a full stop like in [101]. Then, the first processing step [110] consists in removing all unnecessary blanks from the original text thus, leaving only one blank between any two words. The result of this is the canonical form of 'oText' i.e., 'cText' [120] in which no two words are separated by more than one blank. Yet very simple this way of obtaining a canonical text is not the only one possible. FIG. 2 hereafter further elaborates on what a canonical text could possibly be. Although essential to the invention this first step is however considered as being straightforward to implement. Apart from FIG. 2, which considers some possible alternatives for the canonical text, this will not be further discussed. Especially, it will be assumed, in the rest of this description of the invention, that obtaining 'cText' is a trivial operation for the ones skilled in the art. The second, far less trivial, processing step [140] consists in uniquely marking 'cText' by inserting some extra blanks [151] so as to obtain a marked text 'mText' [150]. Inputs to this second processing step [140] are 'cText' [120] on one hand and a shared secret-key [130] on the other hand. A preferred embodiment of this second step is described at length in following figures. However, the whole intent of it is to produce a 'mText' which is unique being given 'cText' and the secret-key. In other words, no one, not sharing the secret-key, should be able to forge easily an 'mText' from a fake or altered 'cText' that is likely to be accepted by the recipient which, applying the same overall process, will not obtain the same pattern of extra blanks [151] thus, permitting to indeed decide that either text has been altered or the sender is not who it pretends to be. Obviously, the insertion of extra blanks at step [140] must be such that it is unfeasible (i.e., in practice, computationally very difficult or long with today's available computing resources) to retrieve the secret-key from 'mText'.

As briefly mentioned herein above sender and receiver apply basically the same process to mark a text or to check it on reception. First step [110] and second step [140] are identical. The only difference is that sender applies the first step from the original text 'oText' while receiver uses the received 'mText'. Both are producing a same 'cText' if 'mText' has not been altered. Recipient authenticates received 'mText' because it is able to reconstruct the same 'mText' from 'cText' i.e., with the same number of extra blanks inserted in the same positions so as when compared [160] both match exactly [161] or comparison fails [162] in which case the received text is rejected.

Finally, to be of practical value the invention requires that the probability of producing randomly the same 'mText' should be extremely low (so as no collision may likely occur that would open the door to an attack that would eventually result in the discovery of the secret-key). In the example of this figure 'oText' is, for practical purposes, a rather short text comprised of 72 words thus, 'cText' has 71 inter-word blanks that is, there are 71 opportunities to insert extra blanks. If, however, one wants to limit the number of inserted blanks to, e.g., 10% of the total number of required inter-word blanks so as a casual reader is unlikely to take notice of them (especially if the font in use is proportional on the contrary of the example in FIG. 1 which uses a fixed-pitch 'courier' font in order to illustrate simply the mechanism of the invention) then, no more than 7 extra blanks should be inserted in the text of this particular example. This corresponds to a probability lower than 1 over $10^9$ and more precisely: $1 \div (C_{71}^7 + C_{71}^6 + C_{71}^5 + C_{71}^4 \ldots)$. This might not be sufficient though to defeat a serious attack thus, suggesting that the invention is better fitted for longer texts with more opportunities to insert blanks unless to accept of inserting more than 10% of blanks especially, in case of rather short texts, like the one of FIG. 1, in which probability could be lowered e.g., roughly by another order of magnitude just by permitting one more extra blank (8 instead of 7) to be inserted. Alternatively, a solution for a short text is to pad it with e.g., a banner, some mail closing information, a disclaimer or a warning text. These are practical necessary tradeoffs which must be considered in the various applications to which invention applies.

FIG. 2 discusses what is possibly a canonical text since it does not exist such a thing as a unique definition of what a canonical text should ideally be. If the example of FIG. 1 assumes that a single blank only is left between any two words (a broad definition of a word here is any number of non-blank characters in between two blanks characters) this simple approach has shortcomings. The recipient of such a soft-copy text has no certain way to reformat the original text since it does not know where lines break. And, if this is a hard-copy text it cannot decide how many extra blanks would be present at the end of each line.

As far as hard-copy texts are concerned, mention must be made that the invention assumes the use of a convenient optical device able to discriminate the number of blanks actually inserted into the text. If counting inserted blanks through a simple visual inspection of a hard-copy text is certainly feasible with fixed-pitch fonts this may become very difficult, if not impossible, when the font used to print the text is non proportional. Anyway, this would be, in both cases, a very cumbersome error prone job. Thus, the application of the invention to hard-copy texts such as [200] requires, in the general case, the use of an appropriate tool set comprised of an optical device and associated computing resources so as a soft copy of a text can be recovered automatically with the right number of blanks inserted between words. Apparatus and software to achieve that are available nowadays. Software programs broadly referred to as OCR (Optical Character Recognition) running e.g., on a PC (Personal Computer) [215] controlling an Optical Scanner [210] are commercially available and widely used.

Therefore, an example of another definition of a canonical text [220], a little bit more sophisticated than the one of FIG. 1, assumes there is still only one blank between words e.g., [230] while three blanks end a line e.g., [240]. Then, marking a text would be done, as in FIG. 1, by inserting one extra blank in selected positions however, always excluding the end of lines (three blanks) so that this form of canonical text becomes compatible both with soft-copy text and hard-copy text yet permitting that the lines of the original text be retrieved from the soft-copy marked text. A minor drawback being that there are less opportunities left to insert extra blanks since end of line [240] inter-words are excluded (so as hard-copy can be handled).

Clearly, in the light of this second example, there are many possibilities to define a set of rules to obtain a canonical text which must be agreed on by all those involved and must be such that creating 'cText' is always unambiguous. That is, being given an original text 'oText' or a received 'mText' it must always exist one possibility, and only one, for the corresponding 'cText'. Depending on the complexity of these rules it may not always be possible to preserve the compatibility between hard and soft copies of a text though. Especially, text formatted from a word processor inserting automatically extra spaces between words so to justify a text (i.e., formatting a text in order it is left and right justified [250]) no longer permit, from the hard-copy text, to discriminate the number of 'real' blanks e.g., [255] inserted in the text by its originator from the extra spaces which may have been inserted by the word processor itself e.g., [260].

In this latter example only a soft copy of a text, encoded with extra blanks, can possibly be handled by the invention however, with the important advantage that, when displayed or printed, text even better hide the blanks that have been purposely added by the originator of the text and which become more indiscernible from spaces added by the text formatter. In this example extracted from a paper by Daniel X. Le, dated Nov. 18, 1997 and untitled 'Document Imaging Software Toolkits, Computer-Assisted Zoning Software, the OCR Voting Machine, and OCR verification Software' available on LD Technologies Inc. WEB site at http://www.ldtechnologies.com/ the text has been formatted using Word97™, the well-known text processor trade mark of Microsoft Corporation, One Microsoft Way, Redmond, Wash. 98052, the USA. This example shows clearly inserted blanks [255] displayed (along with other non printable characters like [265]) under the form of small dots (not printing and not normally displayed) plus the added spaces such as [260] to obtain a left and right justified text.

Figure 3:
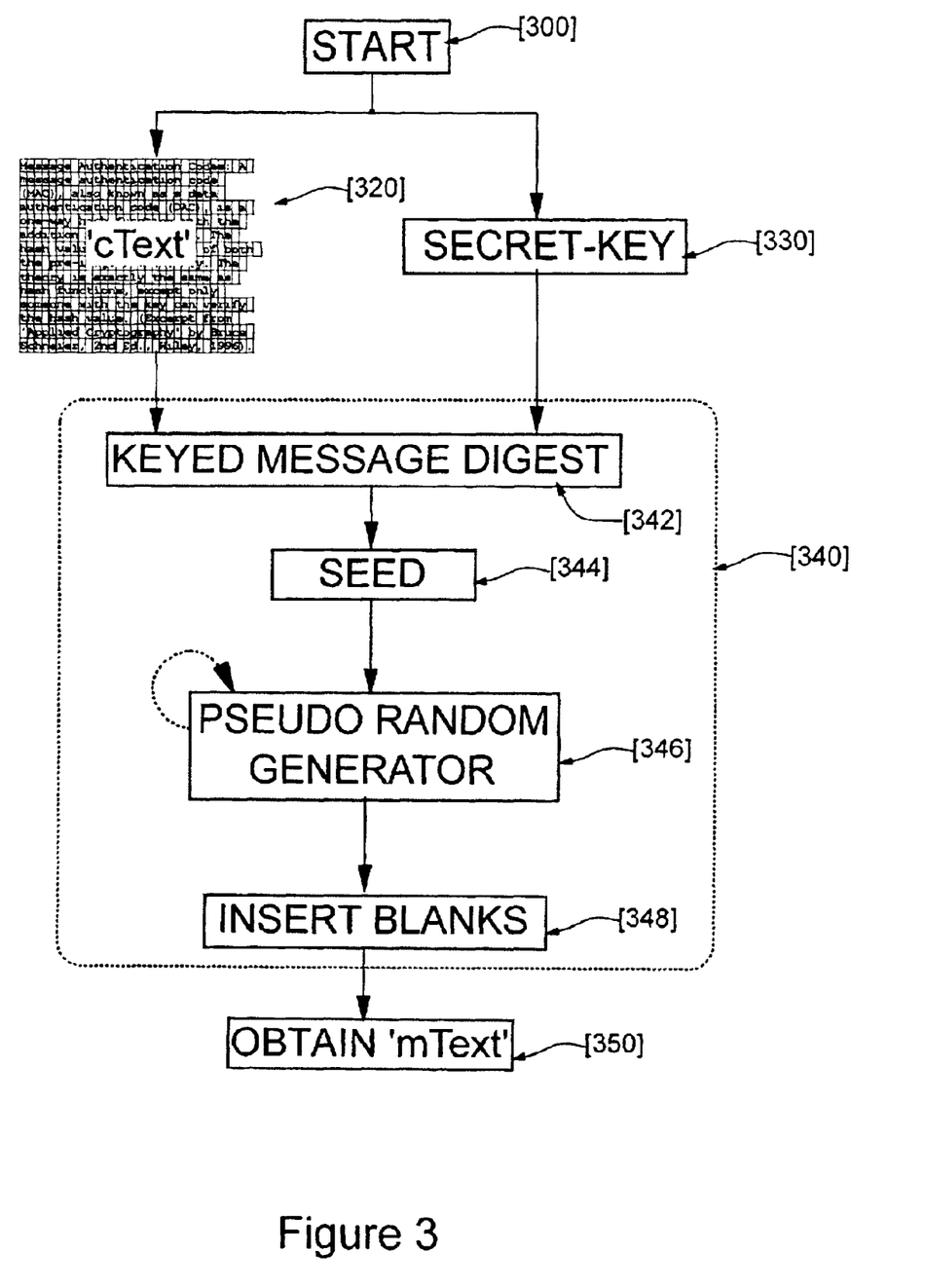
FIG. 3 is an overall description of the main step of the invention, output of which is a marked text which can be authenticated.

FIG. 3 focuses more on the second processing step of the invention i.e., step [140] of FIG. 1. Although there are many equivalent alternatives to carry it out, FIG. 2 depicts an overall preferred embodiment [340] whose details of implementation are further described through examples in the following figures. This step mostly calls for the use of standard techniques known from the art of cryptography (limitations of which have been thoroughly studied and results available in the abundant literature on the subject) so as to produce a 'mText' according to what was described in FIG. 1. Thus, second processing step may start [300] when a secret-key [330] is available and a canonical text 'cText' [320] is made ready. Then, first sub-step [342] is performed. The output of it is a fixed-length keyed message digest representative, on one hand, of 'cText', irrespective of its actual length, and of the secret-key on the other hand. That is, sub-step [342], is aimed at supplying a seed [344] to the next sub-step i.e., the PRN (pseudo-random-number) generator [346]. Seed [344], result of sub-step [342], should ideally be such that, for a given secret-key, no two 'cText' ever output the same value so not only two completely different texts are expected to always produce different values but the faintest alteration to a certain 'cText' should also return a different value. In practice this means that the function used in sub-step [342] must not be statistically biased and computed digest i.e., the seed [344] made wide enough so that the probability of finding two texts returning the same value be extremely low.

Moreover, the seed is made dependent of the secret-key [330] so that it is also different if produced from the same 'cText' however, from a different secret-key. Those skilled in the art will recognize that obtaining such a seed is closely related to obtaining a MAC (Message Authentication Code) which assumes generally the use of a standard technique in cryptography that is, hashing and more specifically with MAC, one-way hashing. Indeed, available one-way hash functions are such that the probability of having two messages hashing to the same value is very unlikely. Also, if one bit changes in the input text then, on the average, half of the bits of the hash result flip and it is practically unfeasible to find a text that hashes to a given value. This latter feature of one-way hash functions is however further discussed in the following since, if it does not hurt, it may not be essential to carry out the invention thus, allowing to somehow simplify this step.

Many hashing algorithms are available. A good overview of them can be found in [SCH/Ch.18]. After (or while) a digest of 'cText' has been (is) obtained it must be combined, in one way or another, with the shared secret-key [330] thus, obtaining a MAC so that only the ones sharing the secret-key are able to verify the hash thus, providing authenticity without secrecy. Therefore, the standard practice for authentication of a soft-copy text is to append a MAC to the corresponding text file so as the recipient can check it while the invention assumes it is used instead as a seed to a PRN generator [346] from which numbers are generated and utilized at sub-step [348] to decide where blanks must be inserted into 'cText' in order to obtain a marked text 'mText' that can be authenticated as it was explained in FIG. 1. How many random numbers are to be generated is directly dependent on what is the acceptable probability of obtaining the same 'mText' purely by chance. Depending on the particular application of the invention this will be an input parameter.

Pseudo-random-number generators are widely used in cryptography and have received considerable attention. Again, a good review can be found in [SCH/Ch.16&17] while a much more theoretical approach to random numbers is e.g., in 'The Art of Computer Programming' by Donald E. KNUTH, Chapter 3, Volume 2, Addison-Wesley. Thus, a convenient pseudo-random generator can be chosen for a particular application of the invention. An example is given in FIG. 5 hereafter. Whichever PRN generator is selected it should preferably be such that it is computationally very hard, if not unfeasible, starting from the pattern of extra blanks, to be able to backtrack to the seed [344]. Provided this is true then, less constraints can be put over step [342]. As previously suggested one-wayness of this step becomes far less critical. The main objective of it, which remains to hold, is that no two 'cText' [320] should ideally return the same seed with an identical secret-key. With this approach, seed [344] needs only to be a unique representation of 'cText' somehow combined with the secret key since it is assumed to be impossible or very hard to backtrack from the pattern of extra blanks to the seed it becomes unimportant to be able to retrieve easily the secret-key from the seed.

Although the following figures are more particularly aimed at illustrating this preferred embodiment of the invention it is however, as well, possible to make other choices better suited to a particular application of the invention. Those skilled in the art will recognize that it is also possible e.g., to choose a weaker PRN generator while putting mostly the difficulty of retrieving the secret-key and ensuring one-wayness into step [342] instead, as standard computation of MACs assume.

Figure 4:
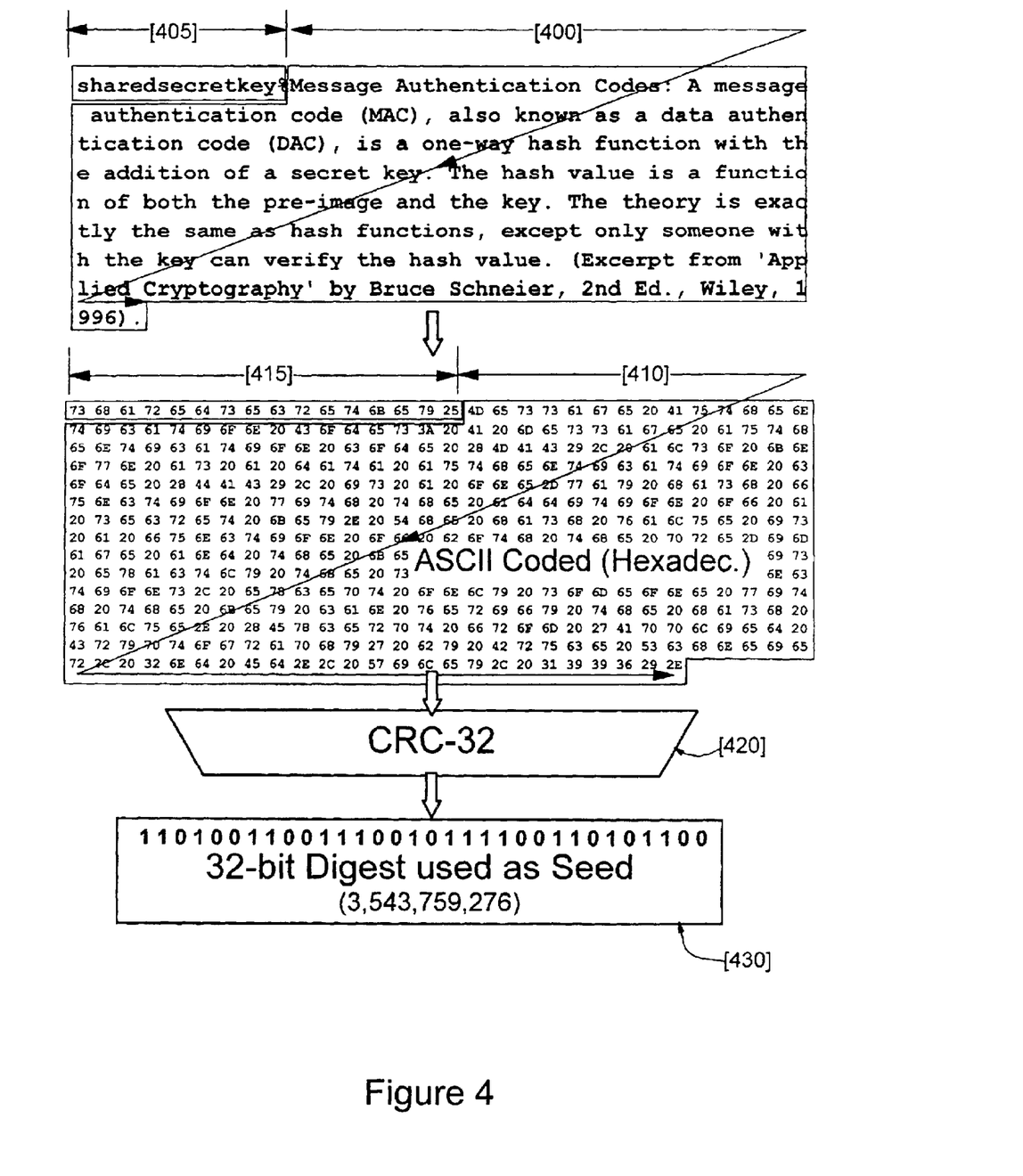
FIG. 4 is one example of how to generate a unique seed which is both dependent on the text and a shared-secret key.

FIG. 4 gives one example on how a digest can be derived from a 'cText' and a secret-key and used as a seed to a PRN generator. Again, this example assumes that being able to backtrack from seed to secret-key at this step is unimportant since one-wayness is rather ensured by the PRN generator, an example of which is given hereafter in FIG. 5.

Therefore, a computationally simple method for generating a seed that can be considered is similar to the way a popular data compression program known under the name of PKZIP™ (a product of PKWARE, Inc., 9025 N. Deerwood Drive, Brown Deer, Wis. 53223, USA having a WEB site at http://www.pkware.com/) performs encryption. This is built around a degree-32 CRC (Cyclic Redundancy Checking) irreducible polynomial referred to as CRC-32 [420] in the following. More on this can be found in [SCH/Ch.16.12]. Then, basically, like with CRC, the method consists in dividing the stream of bits resulting of the conversion of the text characters [400] into their 8-bit binary equivalent by the here above CRC-32 polynomial. That is, each text character is assumed to be e.g., coded in ASCII [410]. The remainder of such a division, which is performed modulo 2 at bit level (with simple XORs) and modulo the CRC-32 polynomial (a 33-bit vector), is at most a 32-bit wide vector [430]. To combine the secret key, so as to obtain a seed which is a function of both text and key, the simplest way is to first concatenate the secret-key, e.g., a 16-character (128 bits) string [405] or [415] in ASCII, with the text so that the remainder of the division is indeed a combination of the text and secret-key. Although PKZIP cipher is known to be weak (as reported by E. Biham and P. C. Kocher in 'A Known Plaintext Attack on the PKZIP Encryption', K. U. Leuven Workshop on Cryptographic Algorithms, Springler-Verlag, 1995) the method is however convenient to generate a seed in the preferred embodiment of the invention since it is PRN generator, in this approach of the invention, to take care of one-wayness. Statistically, the probability of getting the same seed from two different texts is only of 1 over $2^{32}$ or 4,294,967,296. With this particular text and key, digest [430] obtained with CRC-32 function and used as a seed for PRN described in FIG. 5 is, in binary:
b'1 1 0 1 0 0 1 1 0 0 1 1 1 0 0 1 0 1 1 1 1 0 0 1 1 0 1 0 1 1 0 0' or in decimal: 3,543,759,276.

Figure 5:
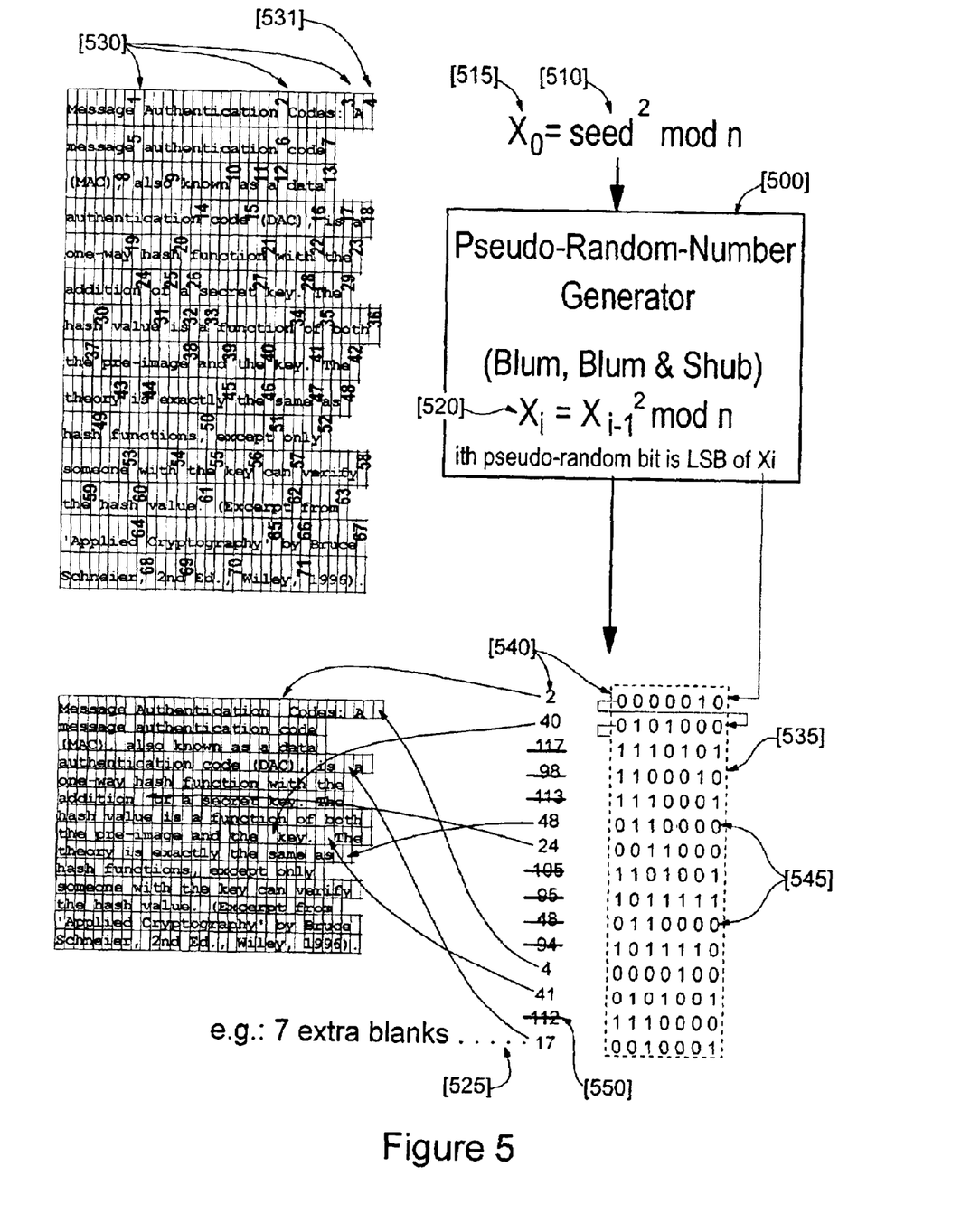
FIG. 5 is one example of a pseudo-random-number generator aimed at producing a stream of numbers to insert blanks between words of the text.

FIG. 5 is an example of a pseudo-random-number (PRN) generator [500] suitable for the preferred embodiment of the invention. BBS (Blum, Blum and Shub) generator described in [SCH/Ch.17.9] is one of the simplest and most efficient generator of its kind. It is said to be unpredictable to the left and unpredictable to the right that is, a cryptanalyst cannot predict neither the next bit in sequence nor the previous one from the sole observation of a given sequence. In the example of this figure it is carried out as follows:

Two large primes p and q are chosen which must be congruent to 3 modulo 4. For the sake of simplicity, because Mersenne's numbers (i.e., prime numbers of the form $2^n-1$) are indeed all congruent to 3 modulo 4, following prime numbers are used in this example:
$p=2^{61}-1=2,305,843,009,213,693,951$ and
$q=2^{89}-1=618,970,019,642,690,137,449,562,111$ and n, the product of p by q (a Blum integer), is:
n=1,427,247,692,705,959,880,439,315,947,500,961,989, 719,490,561.

Then, the seed [510] obtained at previous step is used to compute the starting value $X_0$ [515] of the generator so that, $X_0$=seed$^2$ modulo n with seed=3,543,759,276. After which all successive internal values $X_i$ [520] of generator are computed in the same way. That is, $X_i=X_{i-1}^2$ modulo n. The $i^{th}$ pseudo-random bit is the LSB (Least Significant Bit) of $X_i$. Note that, because seed is a smaller number than either p or q, the requirement of having to choose the seed relatively prime with n, to have BBS working properly, is thus automatically fulfilled.

Enough bits are generated so that enough valid numbers [525] (i.e., 7 in the example of FIG. 5) can be randomly withdrawn to insert extra-blanks (the number of extra blanks to be inserted is an input parameter that must be set for a particular application). Although alternate methods are possible a simple way of achieving this is to index the inter-word blanks of the canonical text e.g., [530]. Depending on what particular format of canonical text has been agreed on, one may have chosen to exclude some inter-word blanks though. As discussed in FIG. 2, the end-of-line blanks [531] could have been excluded. Whichever format is adopted for the canonical text enough bits [535] must be generated from the PRN generator to cover the whole range of blanks of the text (or whatever range is chosen). In this example 7 bits ($2^7-1=127$) are enough to cover the 71 word intervals of the text. Therefore, when 7 bits have been generated a first number is derived [540]. For each next subsequent set of 7 bits a new number is obtained. However, if number is larger than 71 [550] or if a number repeats [545], it is skipped. In this example the following sequence is generated: 2 40 48 24 4 41 17. When a $7^{th}$ valid number is reached [525] (here with 17) the generator is stopped since there are enough blanks to be inserted.

What is claimed is:

1. A method of marking a text document [100] through the insertion of inter-word blank characters, said method comprising the steps of:
   editing [110] the number of said inter-word blank characters of said text document in order to conform to a model to obtain a canonical text document [120]
   retaining, from said canonical text document, to further conform to said model, a subset of positions [230] of said inter-word blank characters, said subset of positions permitting insertion of blank characters; computing, using said canonical text document [120] and a secret-key as inputs [130], a unique combination of positions among said subset of positions; inserting into each position [151] of said unique combination of positions at least one extra blank character thus obtaining a marked text document [150].

2. The method according to claim 1 wherein said text document [100] is said marked text document [150] to be authenticated by a recipient sharing said secret key [130], said method further comprising the step of:

comparing [160] said text document [100] to said marked text document if matching exactly [161]:

accepting said received text document as authentic;

if not [162] rejecting said received text document as fake.

3. A method of marking a text document through the insertion of inter-word blank characters, said method comprising the steps of:

editing the number of said inter-word blank characters of said text document in order to conform to a model to obtain a canonical text document;

wherein said model involves stripping all inter-word blank characters, in excess of one, off said text document, said text document, said model further retaining all said positions of said inter-word b blank characters in said subset of positions;

retaining, from said canonical text document, to further conform to said model, a subset of positions of said inter-word blank characters, said subset of positions permitting insertion of blank characters;

computing, using said canonical text document and a secret-key as inputs, a unique combination of positions among said subset of positions; inserting into each position of said unique combination of positions at least one extra blank character thus obtaining a marked text document; wherein said text document is said marked text document to be authenticated by a recipient sharing said secret-key, said method further comprising the step of comparing [160] said text document [100] to said marked text document;

if matching exactly [161] accepting said received text document as authentic:

if not [162] rejecting said received text document as fake.

4. The method according to claim 3 wherein said model calls for the insertion, into a soft-copy text document, of three blank characters at each end-of-line.

5. The method according to claim 4 wherein said model calls for excluding end-of-line blank characters from said subset of positions.

6. The method according to claim 5 wherein the number of inserted blanks to mark a said text document is set to reach a probability equal to or less than a predefined value of obtaining an identical said marked text document purely by chance.

7. The method according to claim 3 wherein the step of computing a unique combination of positions further includes the steps of:

calculating a digest uniquely representing said secret-key combined with said canonical text deriving from said digest a plurality of randomly distributed numbers fitting in said subset of positions.

8. The method according to claim 7 wherein the step of calculating a digest is replaced by the step of applying a hashing function over said secret-key concatenated with said canonical text thus obtaining a fixed-size keyed digest.

9. The method according to claim 8 wherein the step of deriving a plurality of randomly distributed numbers further includes the steps of:

indexing said subset of positions using said digest as a seed of a PRN (pseudo-random-number) generator, operating said PRN generator; said step of operating said PRN generator further including the steps of retaining those of said numbers that fit said indexing; excluding duplicated said numbers; continuing to operate said PRN generator till enough valid numbers are withdrawn to match the number of blanks to be inserted.

10. An authentication system, suitable for authenticating a text document, comprising means adapted for carrying out the method defined in claim 3.

* * * * *